United States Patent
Abe et al.

(10) Patent No.: US 7,938,099 B2
(45) Date of Patent: May 10, 2011

(54) INTAKE PORT STRUCTURE OF INTERNAL COMBUSTION ENGINE

(75) Inventors: Kazuyoshi Abe, Susono (JP); Akio Yoshimatsu, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 347 days.

(21) Appl. No.: 12/279,580

(22) PCT Filed: Feb. 15, 2007

(86) PCT No.: PCT/IB2007/000754
§ 371 (c)(1),
(2), (4) Date: Aug. 15, 2008

(87) PCT Pub. No.: WO2007/093916
PCT Pub. Date: Aug. 23, 2007

(65) Prior Publication Data
US 2009/0013957 A1  Jan. 15, 2009

(30) Foreign Application Priority Data
Feb. 17, 2006 (JP) ................................ 2006-040763

(51) Int. Cl.
*F02B 31/00* (2006.01)
*F02B 31/08* (2006.01)
(52) U.S. Cl. ...................................................... 123/306
(58) Field of Classification Search .................. 123/306, 123/308, 432, 188.14, 184.56, 184.21, 184.45
See application file for complete search history.

(56) References Cited

U.S. PATENT DOCUMENTS

| 4,240,387 | A | 12/1980 | Motosugi et al. |
| 4,300,500 | A * | 11/1981 | Motosugi et al. ............. 123/308 |
| 5,165,374 | A | 11/1992 | Chapman et al. |
| 7,156,071 | B2 * | 1/2007 | Abe et al. ....................... 123/306 |
| 2002/0148437 | A1 | 10/2002 | Katou et al. |
| 2005/0155570 | A1* | 7/2005 | Confer et al. ................. 123/306 |
| 2006/0219202 | A1 | 10/2006 | Abe et al. |
| 2007/0246009 | A1* | 10/2007 | Suzuki et al. ................. 123/336 |

FOREIGN PATENT DOCUMENTS

| CN | 1 493 777 A | 5/2004 |
| EP | 1 405 993 A2 | 4/2004 |
| JP | 61-25535 | 2/1986 |

(Continued)

OTHER PUBLICATIONS

Notification of the First Office Action for Chinese Appl. No. 2007800038204, dated Dec. 11, 2009.

(Continued)

*Primary Examiner* — Mahmoud Gimie
(74) *Attorney, Agent, or Firm* — Finnegan, Henderson, Farabow, Garrett & Dunner, LLP

(57) ABSTRACT

An intake port structure of an internal combustion engine includes an intake port, a valve shaft provided in proximity to an inner wall of the intake port, and an airflow control valve having a proximal end which is pivotally supported on the valve shaft and a distal end which becomes part of the inner wall of the intake port when the airflow control valve is fully opened. The inner wall of the intake port has a recess into which the airflow control valve is partially or entirely retracted when the airflow control valve is fully opened. The recess has a flow smoothing portion located downstream of the proximal end.

23 Claims, 11 Drawing Sheets

FOREIGN PATENT DOCUMENTS

| | | |
|---|---|---|
| JP | 61-76127 | 5/1986 |
| JP | 3-61669 | 3/1991 |
| JP | 04-136435 | 5/1992 |
| JP | 7-25264 | 5/1995 |
| JP | 2004-44459 | 2/2004 |
| JP | 2006-316736 | 11/2006 |
| NL | 60523 | 2/1948 |
| WO | WO 2007/029104 A2 | 3/2007 |

OTHER PUBLICATIONS

Office Action dated Jul. 14, 2009 from the Japanese Patent Office (and its translation) for JP 2006-040763.

* cited by examiner

INTAKE PORT STRUCTURE OF INTERNAL COMBUSTION ENGINE

CROSS-REFERENCE TO RELATED APPLICATIONS

This application is a national phase application of International Application No. PCT/IB2007/000754, filed Feb. 15, 2007, and claims the priority of Japanese Application No. 2006-040763, filed Feb. 17, 2006, the contents of both of which are incorporated herein by reference.

BACKGROUND OF THE INVENTION

1. Field of the Invention

The invention relates to an intake port structure of an internal combustion engine and more particularly to an intake port structure of an internal combustion engine that includes an airflow control valve which is pivotally supported at its proximal end in proximity to the inner wall of the intake port.

2. Description of the Related Art

A known intake port structure of an internal combustion engine includes an airflow control valve that produces vortical flows, such as tumble flows (longitudinal vortexes) and swirl flows (lateral vortexes). Such vortical flows facilitate mixing of fuel and air and help flames propagate within a combustion chamber, thereby improving the combustion efficiency. In addition, by using such vortical flows, it is possible to concentrate dense air-fuel mixtures around each spark plug and perform stratified combustions. Among such intake port structures, there is known an intake port structure in which an airflow control valve which is pivotally supported at its proximal end is fully opened by being retracted into the inner wall of the intake port, which is disclosed, for example, in Japanese Utility Model Application Publication No. 7-25264.

To allow the pivotal motion of the airflow control valve, it is necessary to provide, in each side of the airflow control valve, gaps (clearances) between the side ends of the airflow control valve and the inner walls of the intake port that face the same side ends of the airflow control valve. FIG. 7A to 7C schematically show a conventional intake port structure 100X of an internal combustion engine (hereinafter, simply referred to as an "intake port structure") that includes an airflow control valve 1X which is pivotally supported at its proximal end on a valve shaft 2. More specifically, FIG. 7A shows the intake port structure 100X in a state where the airflow control valve 1X is fully closed, FIG. 7B shows the intake port structure 100X in a state where the airflow control valve 1X is fully opened, and FIG. 7C shows, for easier understanding of the shape of the airflow control valve 1X, the appearance of the airflow control valve 1X as well as the names of respective portions thereof.

A recess 11X is formed in the intake port 10X. The airflow control valve 1X is retracted into the recess 11X formed in the inner wall of the intake port 10X when the airflow control valve 1X is fully opened, as shown in FIG. 7B. As the recess 11X is thus formed in the intake port 10X, the recess 11X, the inner wall of the intake port 10X, and the wall substantially perpendicular to these recess and inner wall form a step. In the meantime, the gaps are formed between the side ends of the airflow control valve 1X and the inner wall of the intake port 10X. Therefore, when the airflow control valve 1X is fully closed, the intake air flows through these gaps as gap flow F2, in addition to main flow F1 that flows through the intentionally narrowed intake passage. Some gap flow F2, after passing through the gaps, collides with the step and thereby changes its direction upward, just like bouncing up at the step. This gap flow F2 may disturb the main flow F1, making it difficult to stably produce vortical flows in the combustion chamber.

In recent years, an ignition timing retardation control that retards the ignition timing of an internal combustion engine has been widely employed in order to quickly increase the temperature of a catalyst to a reaction temperature after the engine is started. However, when the ignition timing retardation is performed in an internal combustion engine that includes an airflow control valve for producing vortical flows, it is important whether it is possible to maintain a desired stability of combustion using vortical flows, in other words, whether it is possible to stably produce vortical flows, which is fundamentally necessary to achieve stable combustion. That is, unless vortical flows are stably produced, the ignition timing retardation is accordingly limited, and as a result, the effect of reducing emissions from the internal combustion engine is limited inevitably.

SUMMARY OF THE INVENTION

The invention provides an intake port structure of an internal combustion engine that can reduce emissions from the internal combustion engine by minimizing adverse effects caused to the main flow of intake air by the gap flow of intake air that flows through gaps on the sides of an airflow control valve.

An aspect of the present invention relates to an intake port structure of an internal combustion engine. The intake port structure has an intake port, a valve shaft provided in proximity to an inner wall of the intake port, and an airflow control valve having a proximal end which is pivotally supported on the valve shaft and a distal end which becomes part of the inner wall of the intake port when the airflow control valve is fully opened. The inner wall of the intake port has a recess into which the airflow control valve is partially or entirely retracted when the airflow control valve is fully opened. The recess has a flow smoothing portion located downstream of the proximal end. In addition, according to an aspect of the present invention, the recess may be formed not to have a step. Furthermore, each side end of the airflow control valve and the inner wall of the intake port that faces the side end form therebetween a gap through which gap flow of intake air passes when the airflow control valve is fully closed. According to the aspect of the present invention, because the intake air that flows through the gap, namely, the gap flow, does not collide with a step and therefore does not disturb the main flow, for example, unevenness in the strength of produced vortical flows can be reduced. That is, according to the above aspect of the present invention, vortical flows can be stably produced, and therefore it is possible to maintain the combustion mode using vortical flows if the ignition timing of the internal combustion engine is further retarded. Accordingly, the temperature of a catalyst quickly increases to its reaction temperature to reduce emissions from the internal combustion engine. Furthermore, according to the aspect of the present invention, since a desired combustion state can be reliably achieved, reduction of the emissions produced due to variation of the combustion state may be expected.

Meanwhile, the sentence "when the airflow control valve is fully opened, a distal end of the airflow control valve becomes part of the inner wall of the intake port" means that the intake port does not include such a partition that, when the airflow control valve is half-open, the distal end of the airflow control valve is located in proximity to the partition, in order to maintain a biased state of the main flow. That is, it is considered that, when the partition is provided in the intake port, the intake air flowing through the gaps on the side ends of the airflow control valve does not reach the main flow. This is what the sentence refers to. It is applicable that a step is partially not formed. Meanwhile, a typical example of "step" is shown in FIG. 7A and FIG. 7B, which is defined by the inner wall of the intake port, the recess, and the surface perpendicular to each of them. However, it is to be understood that the definition of "step" encompasses any shape that is functionally inevitable for allowing an airflow control valve having a substantially constant thickness to be retracted into the inner wall of the intake port. An example of the functionally inevitable shape may be an arc shape formed between the inner wall and the recess so that the portion does not interfere with the distal end of the airflow control valve, based on the fact that the distal end makes an arc-shaped locus during the pivotal motion of the airflow control valve. Another example of the functionally inevitable shape, instead of the arc-shaped surface, may be a surface formed between the inner wall and the recess and slanting to prevent interference with the distal end of the airflow control valve. In other words, according to this aspect of the present invention, in view of the possibility of the main flow being disturbed by the gap flow, the functionally inevitable shape for preventing interference with the distal end of the airflow control valve may be realized without forming a step.

The "functionally inevitable shape" consists of a shape that basically enables the airflow control valve to be retracted into the inner wall of the intake port and that prevents interference between the inner wall of the intake port and the airflow control valve. The "functionally inevitable shape" does not include a shape that accomplishes advantageous effects which are intended according to aspects of the present invention. That is, the shape of the recess may depend upon the shape of the airflow control valve. Therefore, if the airflow control valve is assumed to be a primary element of the intake port structure, some functional shapes may appear to be essential although they are not in fact. However, for example, as long as the shapes employed according to aspects of the present invention, which are described below, correspond to the advantageous effects intended according to aspects of the present invention, they are not considered to be the "functionally inevitable shape" even if the airflow control valve is assumed to be a primary element. Such structures are considered to be aspects of the present invention. Further, although the recess is formed to store the airflow control valve when the airflow control valve is fully opened, the present invention also encompasses a structure including an airflow control valve that is not entirely retracted into the recess when the airflow control valve is fully opened, as long as the advantageous effects intended according to aspects of the present invention, which are described below, are achieved in the same structure.

In an aspect of the present invention, the recess may have a bottom surface that slants inwardly of the intake port from its upstream end to form the flow smoothing portion. In this case, for example, by forming the bottom surface of the airflow control valve into a shape that does not interfere with the bottom surface of the recess when the airflow control valve is fully opened, or by forming the airflow control valve into a shape that is obtained by cutting off the upper portion that becomes a dead volume when the airflow control valve is fully opened, the airflow control valve can be entirely retracted into the inner wall of the intake port when the airflow control valve is fully opened.

In another aspect of the present invention, the bottom surface may be formed partially in correspondence with the gap. Note that "in correspondence with the gap" means "in correspondence with the flowing manner or mode of intake air flowing through the gaps". That is, in the aspect of the present invention, the bottom surface may be formed partially at a portion where it is necessary to prevent the main flow from being disturbed by the gap flow.

In another aspect of the present invention, the recess has a downstream inner surface that slants inwardly of the intake port from its upstream end to form the flow smoothing portion. In this case, for example, by forming the bottom surface of the airflow control valve into a shape that does not interfere with the downstream inner surface of the recess when the airflow control valve is fully opened, the airflow control valve can be entirely retracted into the inner wall of the intake port when the airflow control valve is fully opened.

In another aspect of the present invention, each side end of the airflow control valve and the inner wall of the intake port that faces the side end form therebetween a gap, and the downstream inner surface may be formed partially in correspondence with the gap.

In another aspect of the present invention, a partition plate that divides an intake passage in the intake port may be provided downstream of the recess. According to this structure, the partition plate effectively prevents the intake air that has passed through the gaps at the airflow control valve from reaching the main flow. If the partition plate is shaped based on the flowing manner or mode of intake air so as not to disturb intake air flow when the airflow control valve is fully opened, resistance against intake air flow can be minimized.

According to the above-described aspects of the present invention, the adverse effects that are caused to the main flow by the intake air flowing through the gaps on the side ends of the airflow control valve are suppressed, and therefore vortical flows can be stably produced, leading to a reduction in the amount of emissions from the internal combustion engine.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF THE EMBODIMENTS

Hereinafter, embodiments of the present invention will be described in detail with reference to the accompanying drawings.

Figure 1A:
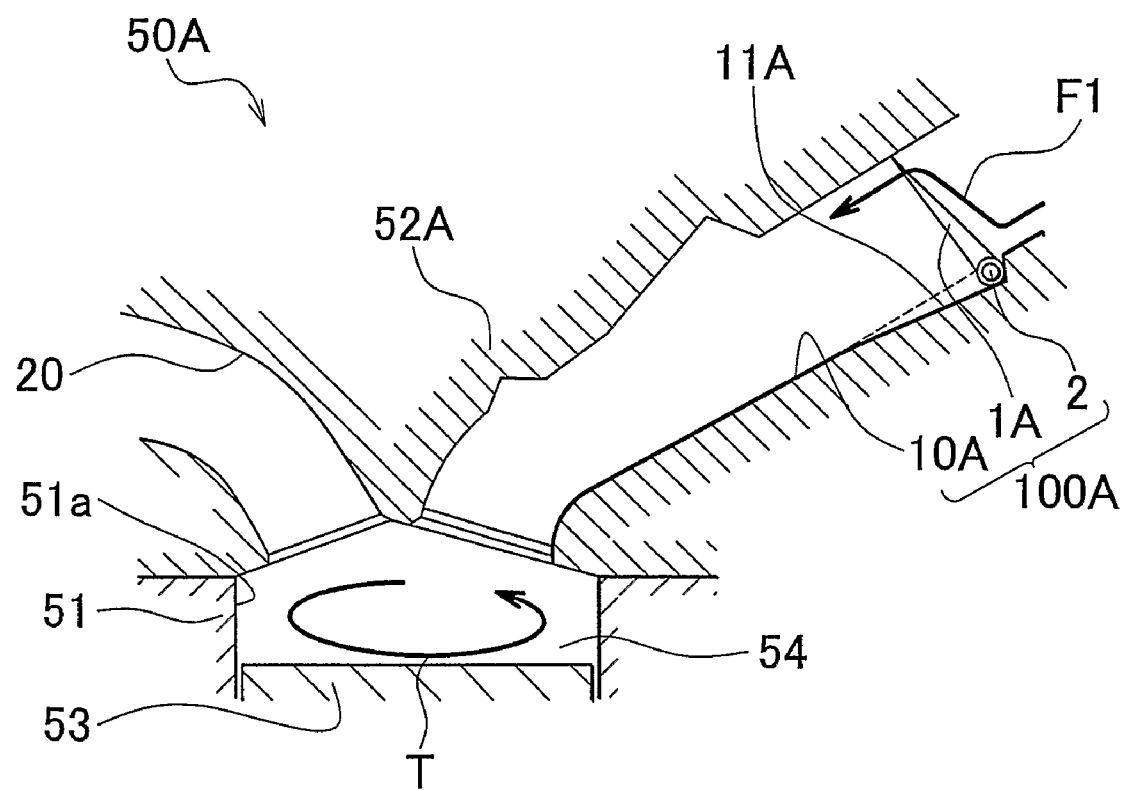
FIG. 1A to FIG. 1C, and FIG. 1E are views schematically showing an intake port structure 100A according to a first embodiment.
Figure 1B:
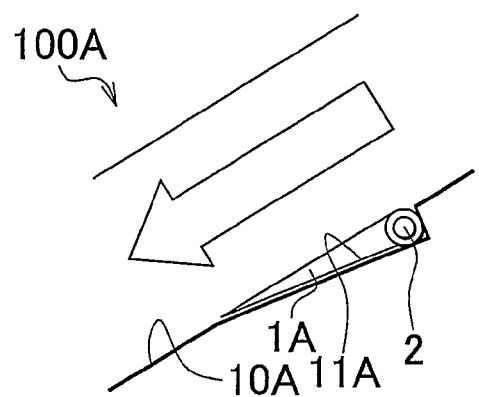
Figure 1C:
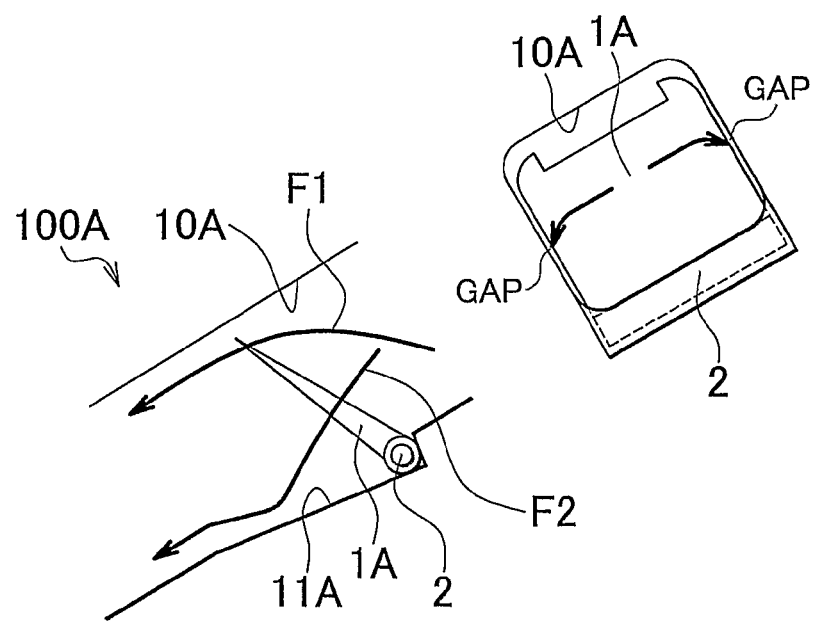
Figure 1D:
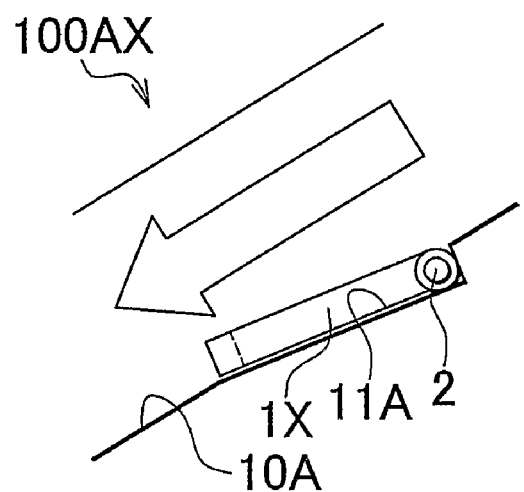
FIG. 1D is a view schematically showing an intake port structure 100AX that is a modification example of the first embodiment.
Figure 1E:
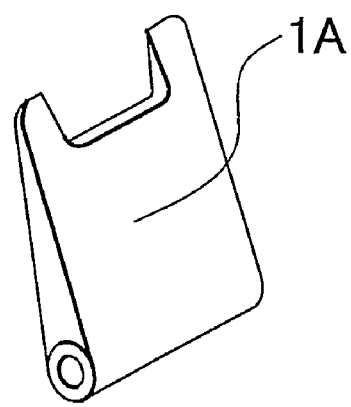
Figure 7A:
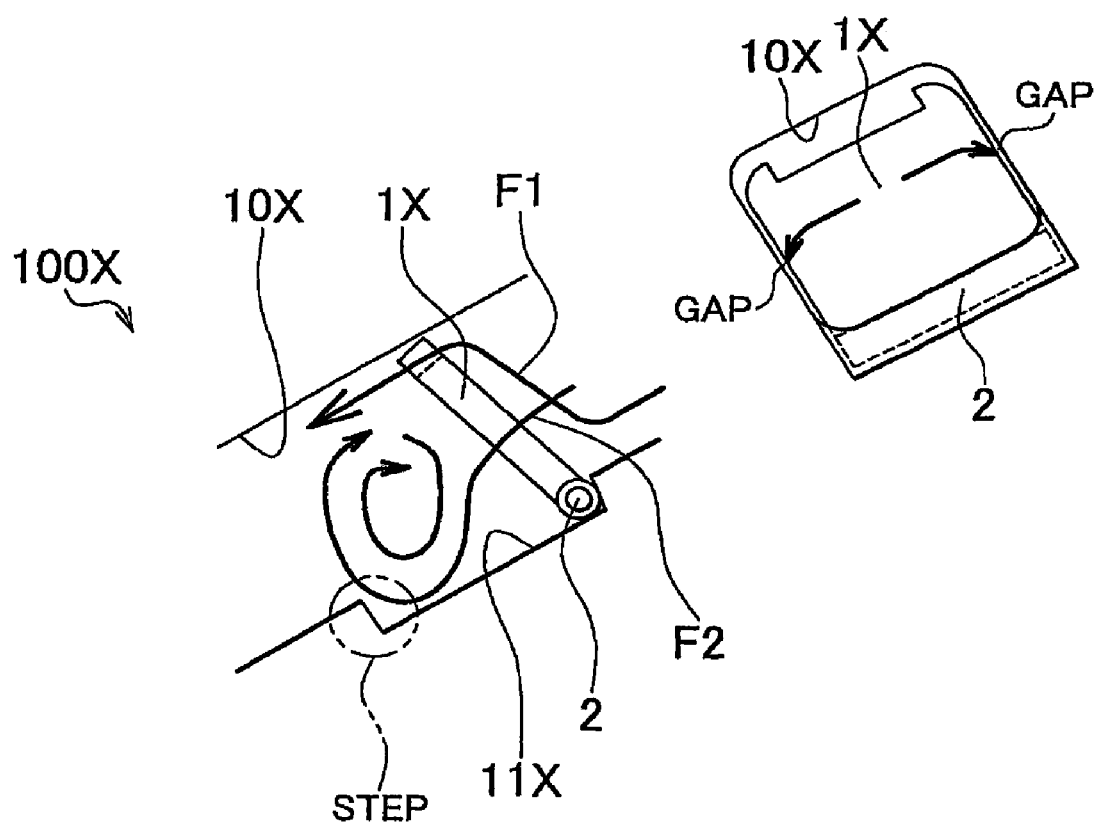
FIG. 7A to FIG. 7C are views schematically showing a conventional intake port structure 100X having an airflow control valve which is supported at its proximal end on a valve shaft 2.
Figure 7B:
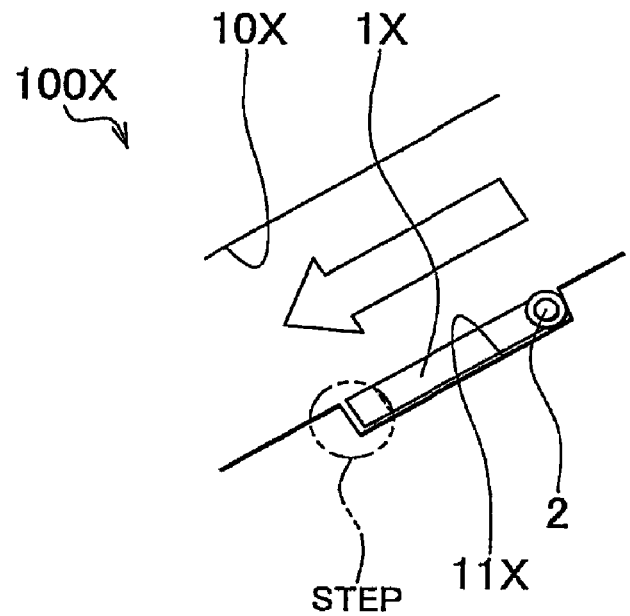
Figure 7C:
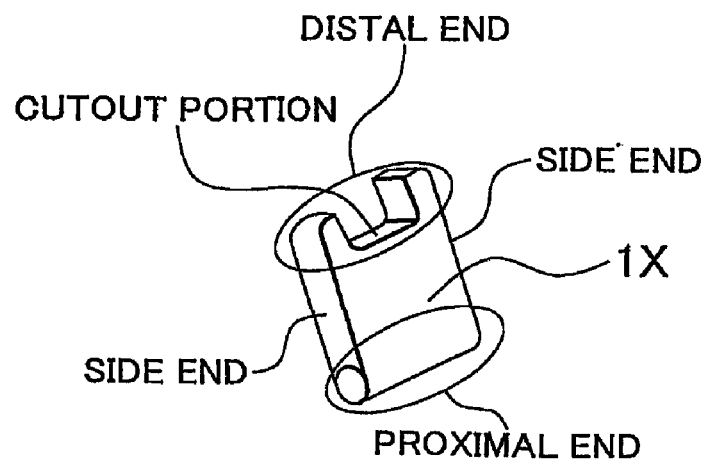

FIG. 1A to FIG. 1E are views schematically showing an intake port structure 100A and an intake port structure 100AX according to a first embodiment of the present invention. Specifically, FIG. 1A is a view showing the intake port structure 100A together with a cylinder block 51, a cylinder head 52A, and a piston 53A, as the main components of an internal combustion engine 50A. FIG. 1B is an enlarged view showing the intake port structure 100A where an airflow control valve 1A is fully opened. FIG. 1C is an enlarged view showing the intake port structure 100A in a state where the airflow control valve 1A is fully closed. FIG. 1D is an enlarged view showing the intake port structure 100A in a state where the airflow control valve 1A is replaced by an airflow control valve 1X. FIG. 1E is a view showing the appearance of the airflow control valve 1A for easier understanding the shape of the airflow control valve 1A. Though not indicated in the drawings, the names of the respective portions of the airflow control valve 1A are the same as those of the airflow control valve 1X indicated in FIG. 7A to FIG. 7C.

The internal combustion engine 50A is a direct injection gasoline engine. However, it is to be understood that application of the intake port structure 100A of the first embodiment is not limited to a so-called lean-burn engine, that is, the intake port structure 100A may be applied to various other engines, such as non-direct injection gasoline engines, diesel engines. The internal combustion engine 50A is an inline four-cylinder engine, but the internal combustion engine 50A may be an engine having more than or less than four cylinders and/or having a non-inline cylinder arrangement. Further, although only the main portions of a cylinder 51a will be described in this embodiment, it is to be understood that each of other cylinders has the same structure as the cylinder 51a.

The internal combustion engine 50A includes the cylinder block 51, the cylinder head 52A, and the piston 53. A cylinder 51a having a cylindrical shape is formed in the cylinder block 51, and the piston 53 is arranged in the cylinder 51a. The cylinder head 52A is fixed on the top of the cylinder block 51. A combustion chamber 54 is a space surrounded by the cylinder block 51, the cylinder head 52A, and the piston 53. Within the cylinder head 52A, an intake port 10A through which intake air is drawn into the combustion chamber 54 and an exhaust port 20 through which combusted gas is discharged from the combustion chamber 54 are formed. An intake valve, not shown in the drawing, is provided to open and close the passage of the intake port 10A, and an exhaust valve, not shown in the drawings, is provided to open and close the passage of the exhaust port 20.

A valve shaft 2 pivotally supports the airflow control valve 1A and is provided in proximity to the inner wall of the intake port 10A. An actuator, not shown in the drawings, operates the valve shaft 2. In this embodiment, the actuator is a step motor. However, it is to be understood that the actuator is not limited to a step motor but may be other device or component. The actuator may be connected to the valve shaft 2 via an appropriate mechanism, such as a link mechanism, a rack-and-pinion mechanism, and a speed-reduction mechanism. The airflow control valve 1A is a component for changing the flow volume and flow rate of intake air, and the airflow control valve 1A is pivotally supported at its proximal end on the valve shaft 2. A cutout portion is formed at the distal end of the airflow control valve 1A to accelerate the main flow when the airflow control valve 1A is fully closed. As the actuator changes the angle of the airflow control valve 1A under the control of ECU (Electric Control Unit), not shown in the drawings, the flow volume and flow rate of intake air change accordingly. The flow of intake air is biased in the intake port 10A as the airflow control valve 1A changes its position from the fully-closed position to the half-open position, and strong tumble flows T are thereby produced within the combustion chamber 54. Note that a cavity for guiding tumble flows T may be formed at the crown of the piston 53. Further, note that vortical flows produced in the combustion chamber 54 are not limited to tumble flows T, but may include tumble flows that swirl in the opposite direction, swirl flows, or inclined tumble flows, such as those produced by combining tumble flows T and swirl flows.

In this embodiment, the recess 11A into which the airflow control valve 1A is retracted when the airflow control valve 1A is fully opened is formed in the inner wall of the intake port 10A. The recess 11A has a bottom surface that slants inwardly of the intake port 10A from its upstream end, the width of the recess 11A, as measured in the direction in which the valve shaft 2 extends, is substantially equal to the width of the intake passage. Thus, the recess 11A provides an additional space that is triangular as viewed in the direction in which the valve shaft 2 extends. That is, the recess 11A has a triangular cross section that is taken perpendicularly to the direction in which the valve shaft 2 extends. The airflow control valve 1A has a triangular shape that is substantially the same as or complementary to the triangular shape of the recess 11A. Specifically, the airflow control valve 1A has a shape that is obtained by cutting off the upper portion of the airflow control valve 1X shown in FIG. 7, which upper portion becomes a dead volume when the airflow control valve 1X is fully opened, in such a manner that the cut surface becomes flat. This shape of the airflow control valve 1A is suitable for enabling the airflow control valve 1A to be retracted into the inner wall of the intake port 10A, namely, the recess 11A. Thus, the airflow control valve 1A is retracted into the inner wall of the intake port 10A when the airflow control valve 1A is fully opened, as shown in FIG. 1B. Thus, the airflow control valve 1A, the valve shaft 2, and the intake port 10A constitute the intake port structure 100A of the first embodiment.

Next, description will be made of how intake air flows when the airflow control valve 1A is fully closed, with reference to FIG. 1C. When the airflow control valve 1A is fully closed, the intake air flowing through the cutout portion forms the main flow F1. Further, when the airflow control valve 1A is fully closed, intake air also flows through the gaps, and this flow of intake air forms the gap flow F2. In this embodiment, because the recess 11A has the bottom surface that slants inwardly of the intake port 10A from its upstream end, no step is formed because of providing the recess 11A for retracting the airflow control valve 1A. In this embodiment, the bottom surface may be regarded as a flow smoothing portion of the present invention. Therefore, the gap flow F2, after colliding with the inner wall of the intake port 10A, flows along the inner wall to the downstream side without changing its direction towards the main flow F1. As a result, the disturbance from the gap flow F2 to the main flow F1 can be minimized and thus tumble flows T can be stably produced within the combustion chamber 54. Furthermore, according to the above structure, the ignition timing can be further retarded after engine start, so that the temperature of the catalyst increases more quickly to its reaction temperature to reduce emissions from the internal combustion engine.

The recess 11A is formed to have a flat surface for ease of production, and the like. However, the shape of the bottom surface is not limited to a flat surface, but it may be a single curved surface, a combination of two or more curved surfaces, a combination of flat surfaces, or a combination of flat and curved surfaces. Although it is preferable that the airflow control valve 1A be shaped such that it can be retracted into the inner wall of the intake port 10A when the airflow control valve 1A is fully opened, the airflow control valve 1X may be used instead of the airflow control valve 1A, as in the intake port structure 100AX shown in FIG. 1D. In this case, however, the upper portion that protrudes into the intake passage becomes a dead volume that undesirably increases resistance against intake air flows. In view of this, the intake port structure 100A of the first embodiment suppresses the adverse effects that are caused to the main flow F1 by the gap flow F2, which enables vortical flows to be stably produced and thereby reduces emissions from the internal combustion engine.

Figure 2A:
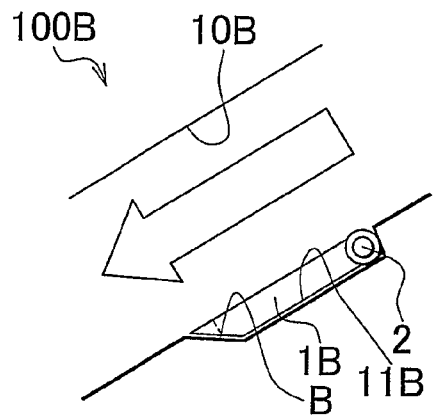
FIG. 2A to FIG. 2C are views schematically showing an intake port structure 100B according to the second embodiment.
Figure 2B:
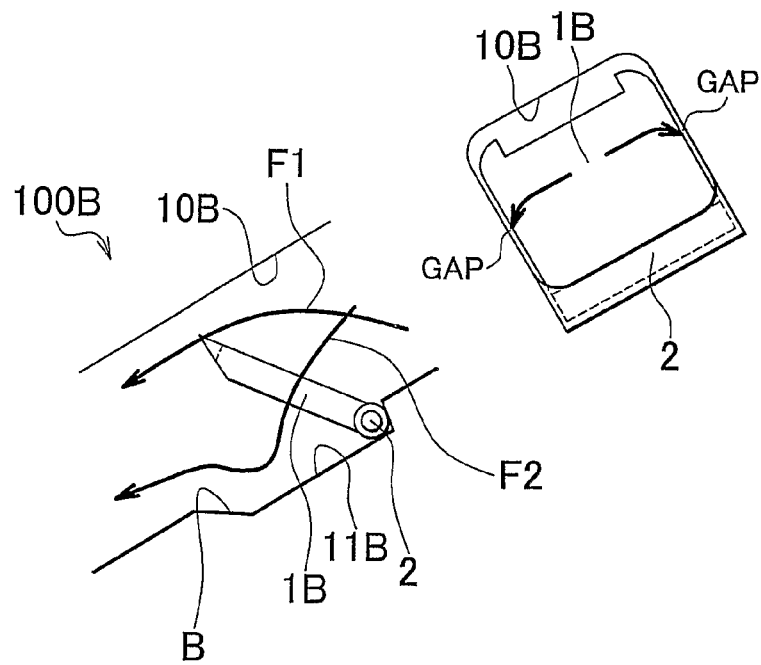
Figure 2C:
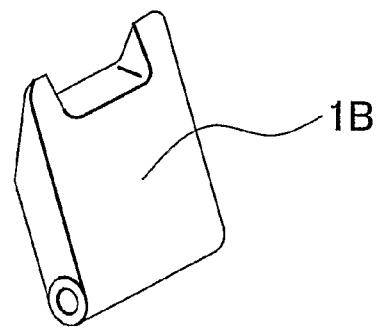

FIG. 2A to FIG. 2C are views schematically showing an intake port structure 100B according to a second embodiment of the present invention. Specifically, FIG. 2A is a view showing the intake port structure 100B in a state where an airflow control valve 1B is fully opened. FIG. 2B is a view showing the intake port structure 100B where the airflow control valve 1B is fully closed. FIG. 2C is a view showing the appearance of the airflow control valve 1B for easier understanding the shape of the airflow control valve 1B. Though not indicated in the drawings, the names of the respective portions of the airflow control valve 1B are the same as those of the airflow control valve 1X shown in FIG. 7A to FIG. 7C. The intake port structure 100B of the second embodiment is the same as the intake port structure 100A of the first embodiment except that the intake port 10A in which the recess 11A is formed is replaced by an intake port 10B in which a recess 11B is formed with a downstream end surface B and that the airflow control valve 1A is replaced by the airflow control valve 1B. The configuration of the internal combustion engine in the second embodiment, not shown in the drawings, is the same as the configuration of the internal combustion engine 50A in the first embodiment except that the intake port structure 100A is replaced by the intake port structure 100B. Thus, the airflow control valve 1B, the valve shaft 2, and the intake port 10B constitute the intake port structure 100B of the second embodiment.

The recess 11b is formed in the inner wall of the intake port 10B, and the airflow control valve 1B is retracted into the recess 11b when the airflow control valve 1B is fully opened. The recess 11b has a downstream inner surface B that slants inwardly of the intake port 10B from its upstream end. That is, the recess 11b has a trapezoidal cross section that is taken perpendicularly to the direction in which the valve shaft 2 extends. Meanwhile, the airflow control valve 1B has a shape that is obtained by cutting off the portion of the airflow control valve 1X shown in FIG. 7A to FIG. 7C, which interferes with the downstream inner surface B when the airflow control valve 1X is fully opened, in such a manner that the cut surface becomes flat. Thus, the airflow control valve 1B is retracted into the inner wall of the intake port 10B when the airflow control valve 1B is fully opened, as shown in FIG. 2A. As shown in FIG. 2B, because the downstream inner surface B is provided, that is, because no step that causes adverse effects to the main flow F1 when the airflow control valve 1B is fully closed is provided, the gap flow F2 flows along the downstream inner surface B to the downstream side. As a result, tumble flows T can be stably produced, and therefore emissions from the internal combustion engine can be reduced. Thus, the intake port structure 100B of the second embodiment suppresses adverse effects that are caused to the main flow F1 by the gap flow F2, which enables vortical flows to be stably produced and thus reduces emissions from the internal combustion engine.

Figure 3A:
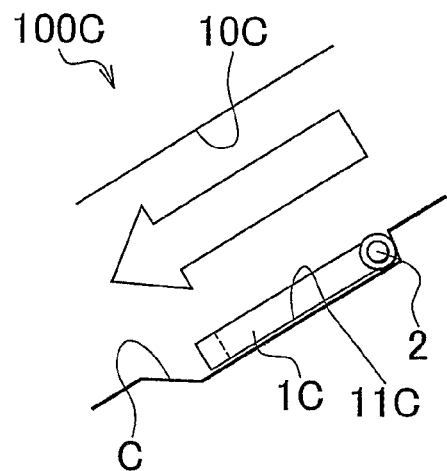
FIG. 3A and FIG. 3B are views schematically showing an intake port structure 100C according to the third embodiment.
Figure 3B:
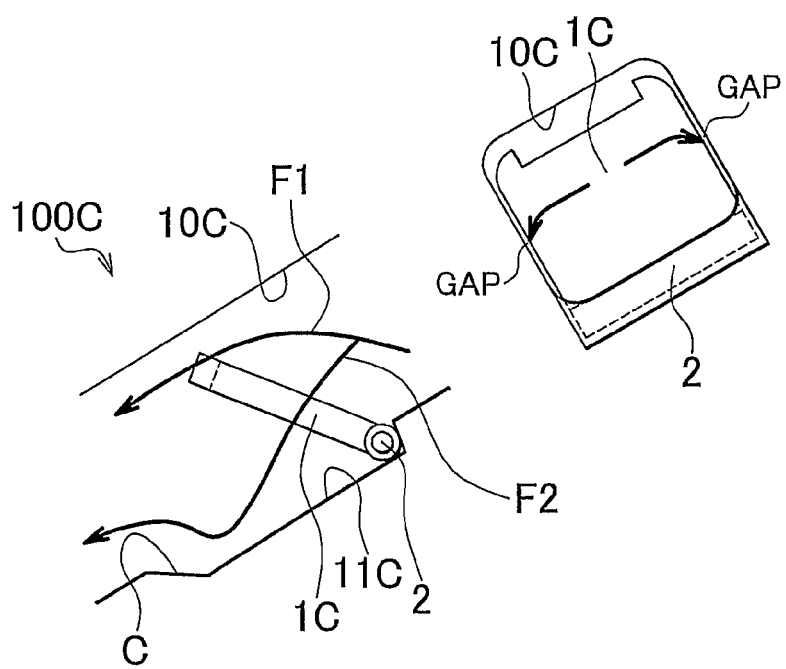

FIG. 3A and FIG. 3B are views schematically showing an intake port structure 100C according to a third embodiment of the present invention. Specifically, FIG. 3A is a view showing the intake port structure 100C in a state where an airflow control valve 1C is fully opened. FIG. 3B is a view showing the intake port structure 100C in a state where the airflow control valve 1C is fully closed. The intake port structure 100C of the third embodiment is the same as the intake port structure 100A of the first embodiment except that the intake port 10A in which the recess 11A is formed is replaced by an intake port 10C in which a recess 11C is formed with a downstream inner surface C and the airflow control valve 1A is replaced by the airflow control valve 1C. The configuration of the internal combustion engine in the third embodiment, not shown in the drawings, is the same as the configuration of the internal combustion engine 50A in the first embodiment except that the intake port structure 100A is replaced by the intake port structure 100C. The airflow control valve 1C in the third embodiment is the same as the airflow control valve 1X shown in FIG. 7A to 7C although they are denoted by different numerals for convenience of description. Thus, the airflow control valve 1C is retracted into the inner wall of the intake port 10C when the airflow control valve 1C is fully opened, as shown in FIG. 3A. Thus, the airflow control valve 1C, the valve shaft 2, and the intake port 10C constitute the intake port structure 100C of the third embodiment.

The recess 11C of the intake port 10C has a downstream inner surface C that slants inwardly of the intake port 10C from its upstream end. That is, the recess 11C has a trapezoidal cross section that is taken perpendicularly to the direction in which the valve shaft 2 extends. Thus, no step that causes adverse effects to the main flow F1 is provided, and therefore the gap flow F2 flows along the surface C to the downstream side when the airflow control valve 1C is fully closed. As a result, tumble flows T can be stably produced, and therefore emissions from the internal combustion engine can be reduced. Thus, the intake port structure 100C of the third embodiment suppresses adverse effects that are caused to the main flow F1 by the gap flow F2, which enables vortical flows to be stably produced and thus reduces emissions from the internal combustion engine.

Figure 4A:
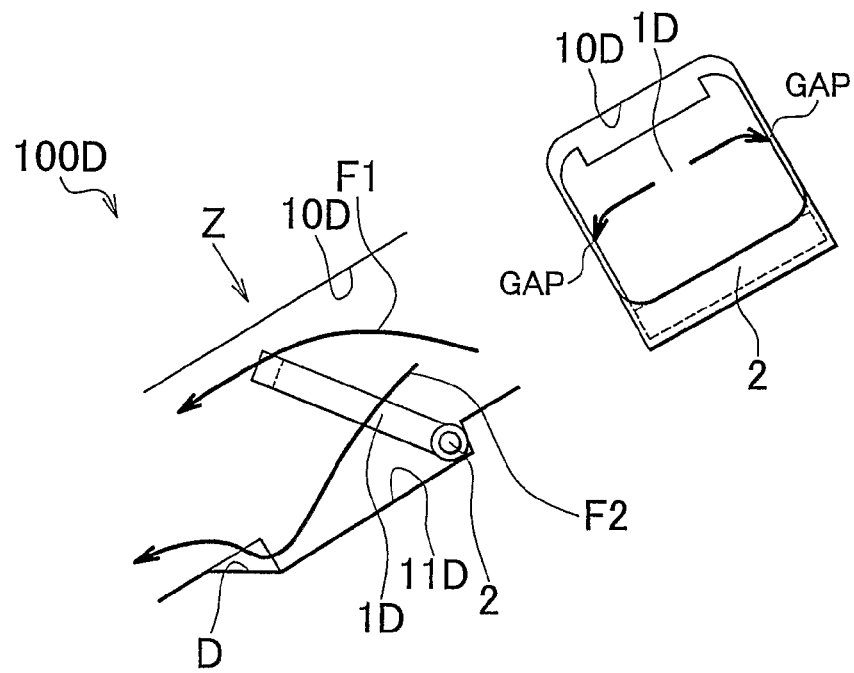
FIG. 4A and FIG. 4B are views schematically showing an intake port structure 100D according to the fourth embodiment.
Figure 4B:
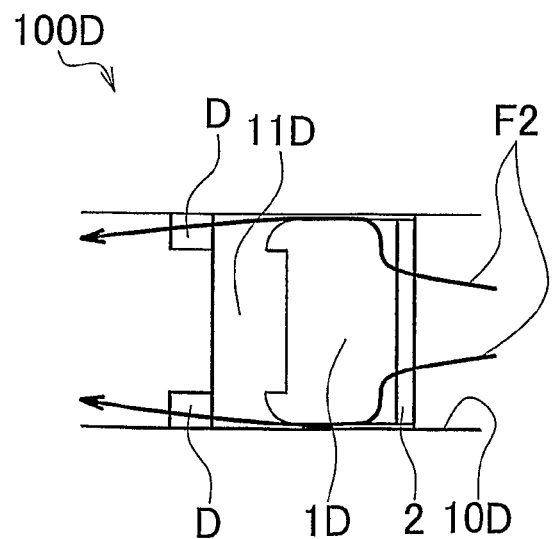

FIG. 4A and FIG. 4B are views schematically showing an intake port structure 100D according to a fourth embodiment of the present invention. Specifically, FIG. 4A is a view showing the intake port structure 100D in a state where an airflow control valve 1D is fully opened. FIG. 4B is a view schematically showing the intake port structure 100D as viewed in the direction designated by the arrow Z. The intake port structure 100D of the fourth embodiment is the same as the intake port structure 100A of the first embodiment except that the intake port 10A in which the recess 11A is formed is replaced by an intake port 10D in which a recess 11D is formed with downstream inner surfaces D and that the airflow control valve 1A is replaced by the airflow control valve 1D. The configuration of the internal combustion engine in the fourth embodiment, not shown in the drawings, is the same as the configuration of the internal combustion engine 50A in the first embodiment except that the intake port structure 100A is replaced by the intake port structure 100D. The airflow control valve 1D in the fourth embodiment is the same as the airflow control valve 1X shown in FIG. 7A to 7C although they are denoted by different numerals for convenience of description. Thus, the airflow control valve 1D is retracted into the inner wall of the intake port 10D when the airflow control valve 1D is fully opened, as shown in FIG. 4A. The airflow control valve 1D, the valve shaft 2, and the intake port 10D constitute the intake port structure 100D of the fourth embodiment.

The recess 11D has downstream inner surfaces D that slant inwardly of the intake port 10D from its upstream end. The downstream inner surfaces D are separately and partially formed in correspondence with the respective gaps. More specifically, the downstream inner surfaces D are formed such that each downstream inner surface D has a certain width as measured, in the direction in which the valve shaft 2 extends, from the portion of the inner wall of the intake port 10D that faces the corresponding side end of the airflow control valve 1D. The width of each downstream inner surface D is determined based on the flowing mode or manner of the gap flow F2. Note that the position of each of the downstream inner surfaces D may be changed in the direction in which the valve shaft 2 extends, based on the flowing mode or manner of the gap flow F2. According to this structure, because no step that causes adverse effects to the main flow F1 is provided, the gap flow F2 flows along the downstream inner surfaces D to the downstream side when the airflow control valve 1D is fully closed, as shown in FIG. 4B. As a result, tumble flows T can be stably produced, and therefore emissions from the internal combustion engine can be reduced. Thus, the intake port structure 100D of the fourth embodiment suppresses adverse effects that are caused to the main flow F1 by the gap flow F2, which enables vortical flows to be stably produced and thus reduces emissions from the internal combustion engine.

Figure 5A:
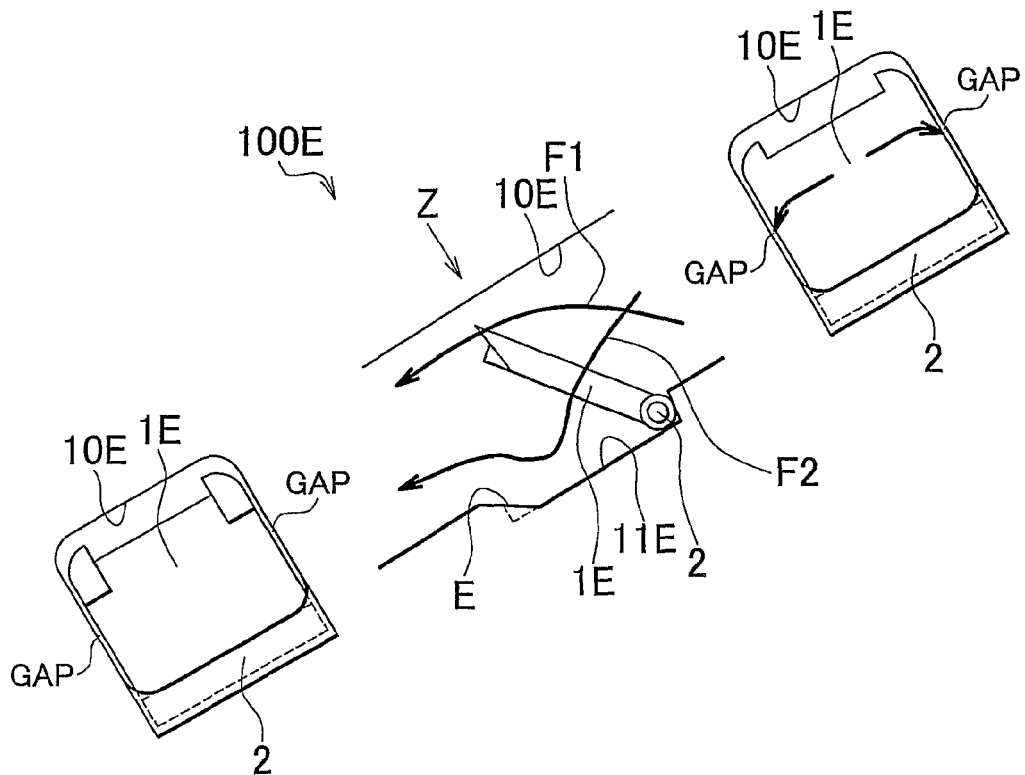
FIG. 5A and FIG. 5B are views schematically showing an intake port structure 100E according to the fifth embodiment.
Figure 5B:
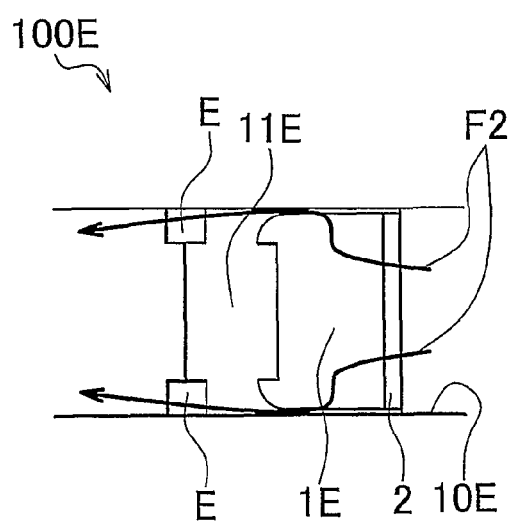

FIG. 5A and FIG. 5B are views schematically showing an intake port structure 100E according to a fifth embodiment of the present invention. Specifically, FIG. 5A is a view showing the intake port structure 100E in a state where an airflow control valve 1E is fully opened. FIG. 5B is a view schematically showing the intake port structure 100E as viewed in the direction designated by the arrow Z. The intake port structure 100E of the fifth embodiment is the same as the intake port structure 100A of the first embodiment except that the intake port 10A in which the recess 11A is formed is replaced by an intake port 10E in which a recess 11E is formed with downstream inner surfaces E and that the airflow control valve 1A is replaced by the airflow control valve 1E. The configuration of the internal combustion engine in the fifth embodiment, not shown in the drawings, is the same as the configuration of the internal combustion engine 50A in the first embodiment except that the intake port structure 100A is replaced by the intake port structure 100E. Thus, the airflow control valve 1E, the valve shaft 2, and the intake port 10E constitute the intake port structure 100E of the fifth embodiment.

The recess 11E is formed in the inner wall of the intake port 10E and the airflow control valve 1E is retracted into the recess 11E when the airflow control valve 1E is fully opened. The recess 11E has the downstream inner surfaces E that slant inwardly of the intake port 10E from its upstream end. The downstream inner surfaces E are separately and partially formed in correspondence with the respective gaps. More specifically, the downstream inner surfaces E are formed such that each downstream inner surface E has a certain width as measured, in the direction in which the valve shaft 2 extends, from the portion of the inner wall of the intake port 10E that faces the corresponding side end of the airflow control valve 1E. The width of each downstream inner surface E is determined based on the flowing mode or manner of the gap flow F2. Note that the position of each of the downstream inner surfaces E may be changed in the direction in which the valve shaft 2 extends, according to the flowing mode or manner of the gap flow F2. Meanwhile, the airflow control valve 1E has a shape that is obtained by cutting off the portions of the airflow control valve 1X shown in FIG. 7A to FIG. 7C that interfere with the respective surfaces E, in such a manner that the cut surfaces become flat. Thus, the airflow control valve 1E is retracted into the inner wall of the intake port 10E when the airflow control valve 1E is fully opened.

Furthermore, in the fifth embodiment, because the downstream inner surfaces E are formed, that is, because no step that causes adverse effects to the main flow F1 is provided, the gap flow F2 flows along the surfaces E to the downstream side. As a result, tumble flows T can be stably produced, and therefore emissions from the internal combustion engine can be reduced. The intake port structure 100E of the fifth embodiment is an example in which downstream inner surfaces are partially formed, and which corresponds to the intake port structure 100B of the second embodiment. However, the intake port structure 100E may alternatively be such that, for example, downstream inner surfaces are partially formed to be suitable in the intake port structure 100A of the first embodiment. Thus, the intake port structure 100E of the fifth embodiment suppresses adverse effects that are caused to the main flow F1 by the gap flow F2, which enables vortical flows to be stably produced and thus reduces emissions from the internal combustion engine.

Figure 6A:
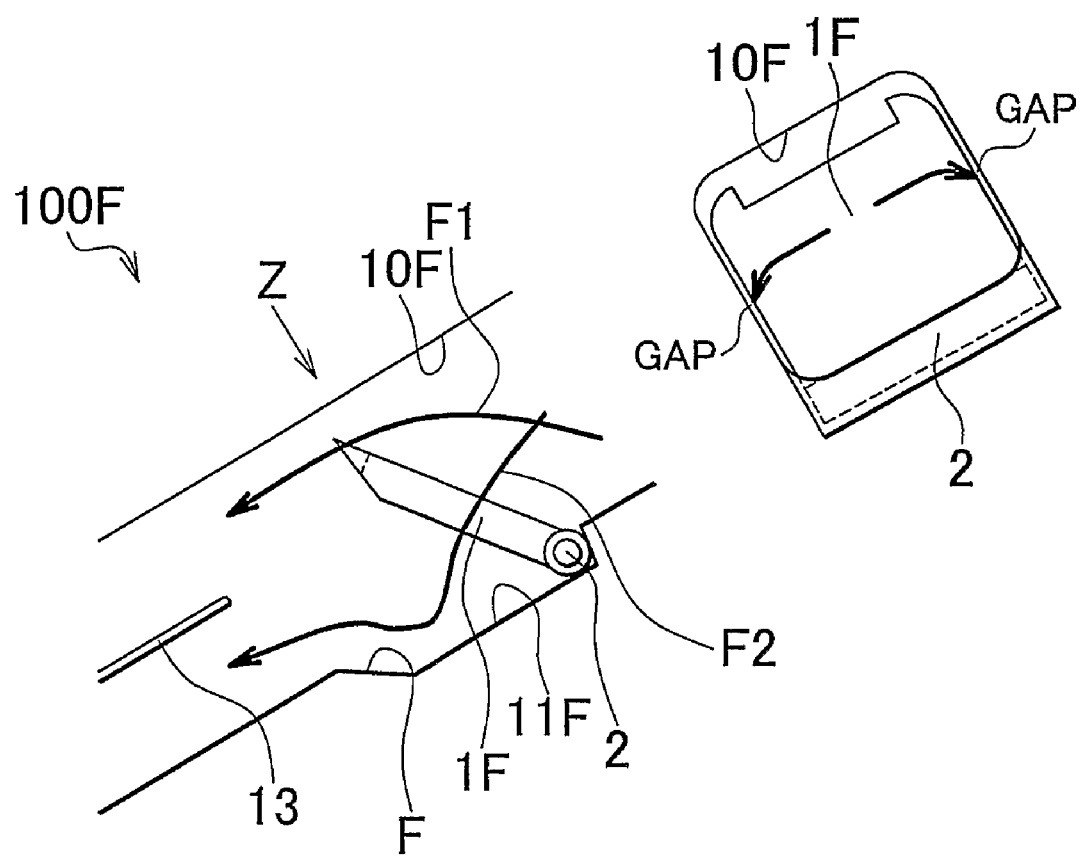
FIG. 6A and FIG. 6B are views schematically showing an intake port structure 100F according to the sixth embodiment.
Figure 6B:
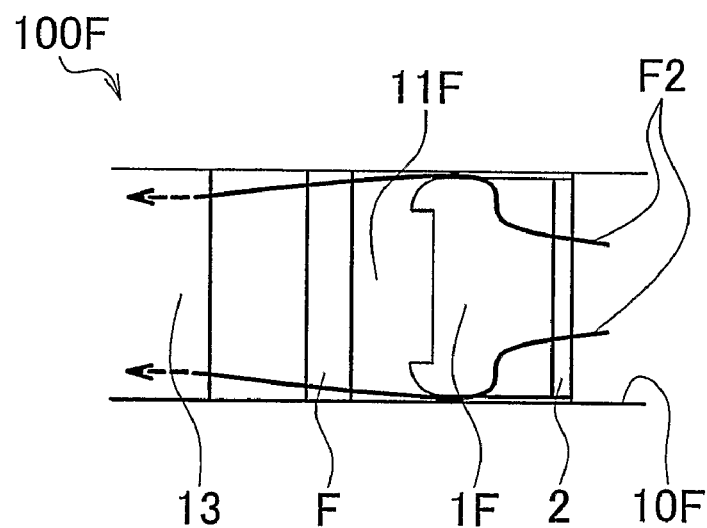
Figure 6C:
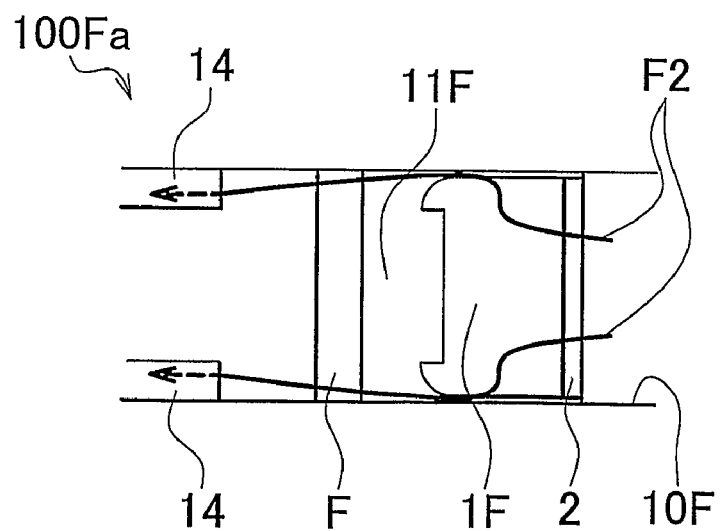
FIG. 6C is a view schematically showing an intake port structure 100Fa that is a modification example of the sixth embodiment.

FIG. 6A to FIG. 6C are views schematically showing an intake port structure 100F according to the sixth embodiment of the present invention. Specifically, FIG. 6A is a view showing the intake port structure 100F having a partition plate 13 in a state where an airflow control valve 1F is fully closed. FIG. 6B is a view showing the intake port structure 100F as viewed in the direction designated by the arrow Z. FIG. 6C is a view showing an intake port structure 100Fa having partition plates 14 instead of ⊤ ㅊ partition plate 13. The intake port structure 100F of the sixth embodiment is the same as the intake port structure 100B of the second embodiment except that the intake port 10B is replaced by an intake port 10F. The intake port 10F has the same structure as the intake port 10B except for the partition plate 13 additionally provided. The airflow control valve 1F in the sixth embodiment is the same as the airflow control valve 1B in the second embodiment although they are denoted by different numerals for convenience of description. A recess 11F and a downstream inner surface F in the sixth embodiment are the same as the recess 11B and the downstream inner surface B in the second embodiment. Thus, the airflow control valve 1F is retracted into the inner wall of the intake port 10F when the airflow control valve 1F is fully opened, as shown in FIG. 6A. The airflow control valve 1F, the valve shaft 2, the intake port 10F, and the partition plate 13 constitute the intake port structure 100F of the sixth embodiment.

The partition plate 13 is arranged downstream of the downstream end of the recess 11F so that the partition plate 13 divides the intake passage into two passages. The partition plate 13 extends a predetermined distance substantially in parallel to the direction in which the intake port 1OF extends, and extends from one side of the inner wall to the other side in the direction in which the valve shaft 2 extends. The position of the upstream end of the partition plate 13 and the length of the partition plate 13 are determined based on the flowing mode or manner of the gap flow F2. The partition plate 13 prevents the gap flow F2 from reaching the main flow Fl.

Therefore, when the airflow control valve F1 shown in FIG. 6B is fully closed, the gap flow F2 is blocked by the partition plate 13 such that the gap flow F2 does not flow towards the main flow F1 after flowing along the respective surfaces F, and this more reliably prevents the main flow F1 from being disturbed by the gap flow F2. As a result, tumble flows T can be stably produced, and therefore emissions from the internal combustion engine can be reduced. Note that the partition plates 14 shown in FIG. 6C may replace the partition plate 13. That is, even when partition plates are provided partially in the direction in which the valve shaft 2 extends, that is, in correspondence with the gaps, it is possible to suppress the flow of the gap flow F2 towards the main flow F1.

Further, whether the partition plate 13 or the partition plates 14 are used may be determined based on the flowing mode or manner of the gap flow F2. Also, based on the flowing manner or mode of the gap flow F2, an appropriate number of partition plates each having desired length, thickness, and width, and formed into a specific shape, such as a curved shape, may be arranged at appropriate positions instead of the partition plates 13, 14. While the downstream inner surfaces B to F, which are flat surfaces, are formed in the foregoing embodiments including the sixth embodiment, various non-flat surfaces may alternatively be formed, provided that no step that causes adverse effect to the main flow F1 is formed. Although it is preferable that the airflow control valves 1B to 1F be shaped such that each of them can be retracted into the inner wall of the intake port when fully opened, their shapes are not limited to this. Thus, the intake port structure 100F of the sixth embodiment suppresses adverse effects that are caused to the main flow F1 by the gap flow F2, which enables vortical flows to be stably produced and thus reduces emissions from the internal combustion engine.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. An intake port structure of an internal combustion engine, comprising:
   an intake port;
   a valve shaft provided in proximity to an inner wall of the intake port; and
   an airflow control valve having a proximal end which is pivotally supported on the valve shaft and a distal end which becomes part of the inner wall of the intake port when the airflow control valve is fully opened, wherein
   the inner wall of the intake port has a recess into which the airflow control valve is partially or entirely retracted when the airflow control valve is fully opened, and
   the recess has a bottom surface portion that slants inwardly in a direction from an upstream side to a downstream side to form a flow smoothing portion that is located downstream of the proximal end, and
   the airflow control valve has a slanted surface portion that mates with the bottom surface portion when the airflow control valve is fully opened.

2. The intake port structure according to claim 1, wherein the recess is formed not to have a step at its downstream side.

3. The intake port structure according to claim 1, wherein the bottom surface connects with the inner wall of the intake port at its downstream end.

4. The intake port structure according to claim 1, wherein each side end of the airflow control valve and the inner wall of the intake port that faces the side end form therebetween a gap, and wherein the bottom surface is formed partially in correspondence with the gap.

5. The intake port structure according to claim 1, wherein the recess has a bottom surface and a downstream inner surface that slants inwardly of the intake port from its upstream end to form the flow smoothing portion.

6. The intake port structure according to claim 5, wherein each side end of the airflow control valve and the inner wall of the intake port that faces the side end form therebetween a gap, and wherein the downstream inner surface is formed partially in correspondence with the gap.

7. The intake port structure according to claim 1, wherein the recess has a triangular cross section that is taken perpendicularly to a direction in which the valve shaft extends.

8. The intake port structure according to claim 1, wherein the recess has a trapezoidal cross section that is taken perpendicularly to a direction in which the valve shaft extends.

9. The intake port structure according to claim 8, wherein each side end of the airflow control valve and the inner wall of the intake port that faces the side end form therebetween a gap, and wherein the recess has the trapezoidal cross section partially in correspondence with the gap.

10. The intake port structure according to claim 1, wherein the airflow control valve has a complementary cross section to the recess when the cross section is taken in a direction in which the valve shaft extends.

11. The intake port structure according to claim 1, wherein the intake port structure further comprises a partition plate that divides an intake passage in the intake port, wherein the partition plate is located downstream of the recess.

12. The intake port structure according to claim 11, wherein the partition plate is partially provided in a direction in which the valve shaft extends.

13. The intake port structure according to claim 12, wherein each side end of the airflow control valve and the inner wall of the intake port that faces the side end form therebetween a gap, and wherein the partition plate is partially provided in correspondence with the gap.

14. The intake port structure according to claim 11, wherein the partition plate extends from one side of the inner wall to the other side in the direction in which the valve shaft extends.

15. The intake port structure according to claim 2, wherein each side end of the airflow control valve and the inner wall of the intake port that faces the side end form therebetween a gap through which gap flow of intake air passes when the airflow control valve is fully closed.

16. The intake port structure according to claim 5, wherein the airflow control valve has a complementary cross section to the recess when the cross section is taken in a direction in which the valve shaft extends.

17. The intake port structure according to claim 7, wherein the airflow control valve has a complementary cross section to the recess when the cross section is taken in a direction in which the valve shaft extends.

18. The intake port structure according to claim 8, wherein the airflow control valve has a complementary cross section to the recess when the cross section is taken in a direction in which the valve shaft extends.

19. The intake port structure according to claim 1, wherein each side end of the airflow control valve and the inner wall of the intake port that faces the side end form therebetween a gap through which gap flow of intake air passes when the airflow control valve is fully closed.

20. The intake port structure according to claim 5, wherein each side end of the airflow control valve and the inner wall of the intake port that faces the side end form therebetween a gap through which gap flow of intake air passes when the airflow control valve is fully closed.

21. The intake port structure according to claim 7, wherein each side end of the airflow control valve and the inner wall of the intake port that faces the side end form therebetween a gap through which gap flow of intake air passes when the airflow control valve is fully closed.

22. The intake port structure according to claim 8, wherein each side end of the airflow control valve and the inner wall of the intake port that faces the side end form therebetween a gap through which gap flow of intake air passes when the airflow control valve is fully closed.

23. The intake port structure according to claim 11, wherein each side end of the airflow control valve and the inner wall of the intake port that faces the side end form therebetween a gap through which gap flow of intake air passes when the airflow control valve is fully closed.

* * * * *